Oct. 22, 1968　　　R. S. NEASHAM　　　3,407,020
CINEMATOGRAPHIC METHOD
Filed July 27, 1965　　　　　　　　　3 Sheets-Sheet 1

FIG. I

INVENTOR
ROBERT S. NEASHAM

BY Claude Funkhouser
ATTORNEY
Lawrence A. Hoffman
AGENT

Oct. 22, 1968  R. S. NEASHAM  3,407,020
CINEMATOGRAPHIC METHOD
Filed July 27, 1965  3 Sheets-Sheet 3

United States Patent Office 3,407,020
Patented Oct. 22, 1968

3,407,020
CINEMATOGRAPHIC METHOD
Robert Stevenson Neasham, 1910 W. Surrey Ave.,
Phoenix, Ariz. 85029
Filed July 27, 1965, Ser. No. 475,297
2 Claims. (Cl. 352—38)

ABSTRACT OF THE DISCLOSURE

A method of interpreting information contained in a photographic record of frames from an aerial photographic strip to provide a positive transparency and selecting a frame from the transparency. Exposing a number of frames from a second film, differing in contrast from the first film, each frame of the second film being representative of the selected transparency. Producing a continuous film strip from the second film and viewing the continuous film strip by means of a screen and projector.

---

The invention described herein may be manufactured and used by or for the Government of the United States of America for governmental purposes without the payment of any royalties thereon or therefor.

The present invention relates to photo intelligence techniques, and more particularly to the employment of cinematographic techniques for exploiting to the fullest the high acuity films presently available for aerial photography with the timeliness, accuracy and economy of effort and personnel commensurate with modern intelligence requirements.

In order to exploit the photo intelligence available from a film medium as obtained by aerial photography, it is necessary to reduce the photographic record to a form which is easily assimilated by the human interpreter. Because of the complex nature of the photographic picture, it can record far more shades of gray and more resolution than it is possible to read directly with the human eye. For example, high acuity films having resolution between 100 and 300 or more lines per millimeter are well within the present state of the art. On the other hand, a man with average visual capabilities is able to discriminate between about 5 to 7 optical lines per millimeter at a viewing distance of 10 inches, with the unaided eye. Similarly, while viewing a photographic print, the human eye can discriminate between about 21 shades of gray, between black and white, in steps of about 0.045 density difference, yet in viewing a print on a transparent base (i.e., a positive transparency), the eye can discriminate or detect approximately 75 to 100 shades of gray by the use of variable intensity illumination behind the transparency.

The process of interpretation requires that the resolution and gray scale capabilities of the photograph be reduced to within the limits of man's readout capability. In doing so, one naturally employs magnification for the resolution. This means that the aerial photograph must be enlarged between 20 and 60 times for a film having a resolution of 100 to 300 lines per millimeter to reduce the spacial density to within human resolution capability.

The contrast of the original photograph or negative suffers tremendously under these magnifications unless compensating steps are taken to help maintain the contrast of the original. Significant research has been done in this area and has produced such techniques as density cutting, unsharp marking, and various other techniques.

Various techniques have been available previously for the magnification of aerial photography. However, these techniques have not proved entirely satisfactory. For example, contact printing under normal techniques has always caused a great loss in resolution and gray scale. Therefore, a reduction of quality of a high acuity original negative will result from the utilization of such techniques.

Projection magnification employing a viewer has been the most advanced method of handling the high acuity systems input because it offers the dynamic capability of handling large quantities of film. This technique has been fairly successful, but has one serious drawback, namely, there is a large drop in the contrast of the image on the screen over that of the original. This has been attributed to the screen materials available, although this is only a part of the problem. Much of the image detail is lost before it ever reaches the screen, mainly in the transfer from the negative to the positive.

An improved projection viewing system utilizing interferrome ric techniques is disclosed in applicant's copending U.S. patent application, Ser. No. 450,554 filed Apr. 23, 1965, entitled Variable Contrast Interference Viewer, Patent No. 3,311,018.

A much slower technique which does not suffer from the screen loss of projection magnification is the use of microscopes and direct optical viewing of the positive transparency. However, while one achieves the proper magnification and a high degree of contrast transfer by this method, one loses the capability of handling large volumes of film. The area viewed by a microscope is only a few millimeters at 60 times magnification, and this system further requires manually adjusting the film on the stage plate of the microscope at all times. Under such conditions, it is very difficult because of the high degree of mental concentration required, for the observer to become and remain oriented, particularly for any extended period of time, both as to the location of a particular frame, and as to the corresponding geographical position as well.

A typical process of aerial photography provides as the input data to a photo interpretation system, a photographic negative many thousands of feet long, having recorded resolution characteristics at least as high as 300 lines per millimeter. On film of this type, a picture of an object having a dimension perhaps of a quarter of an inch would represent an actual dimension of about 5 feet. A promising technique for locating such a quarter inch dimension on a film many thousands of feet long may be an interpretation process having a 3 or 4 visual display by which the highly magnified object in a first display segment may be located as part of a city block; for example, in a second segment of lower magnification, while a third segment of even lower magnification would indicate the relation of the city block, for example, to the city itself. In addition, a fourth display segment might serve to orient the position of the city itself within the surrounding territory. A disclosure of techniques to provide this multi-segment display may be found in applicant's copending U.S. patent application, Ser. No. 497,563, entitled Photo Interpretor Cell, filed Oct. 18, 1965.

It is, therefore, an object of the present invention to provide improved techniques for the interpretation of photo intelligence.

It is a further object of the present invention to provide a photo interpretation technique which involves the use of cinematographic methods.

It is a further object of the present invention to provide a technique for photo interpretation which will allow far greater efficiency to be achieved by the interpreter than has heretofore been possible.

It is a further object of the present invention to provide a technique for photo interpretation which overcomes some of the inherent limitations in the systems and techniques heretofore or now in general use.

It is a further object of the present invention to provide a photo interpretation technique by which the available high contrast and resolution of modern photographic films may be utilized to a very high degree.

It is a further object of the present invention to provide a photo interpretation technique readily adaptable to computer control by which the interpreter may be constantly and automatically aware of the orientation and geographic positions of the intelligence data being evaluated.

It is a further object of this invention to provide a photo interpretation technique readily adaptable for simultaneous use by a number of photo interpreters, thereby increasing the probability of accurate judgment in the evaluation process.

The above enumerated objects are accomplished in the present invention by a technique which generally encompasses the steps of sub-dividing the basic aerial photograph negative into a very large number of small segments, magnifying and reproducing each of these segments successively to form a motion picture, projecting this motion picture with further magnification onto a viewing screen, selecting those frames of the motion picture which appear to contain significant intelligence data, and providing a second motion picture of those frames of interest by the application of various photographic image enhancement techniques to more clearly display for the photo interpreter the nature of the particular object in the frames of interest.

The exact nature of this invention as well as other objects and advantages thereof will be readily apparent from consideration of the following specification relating to the annexed drawings in which.

Figure 1:
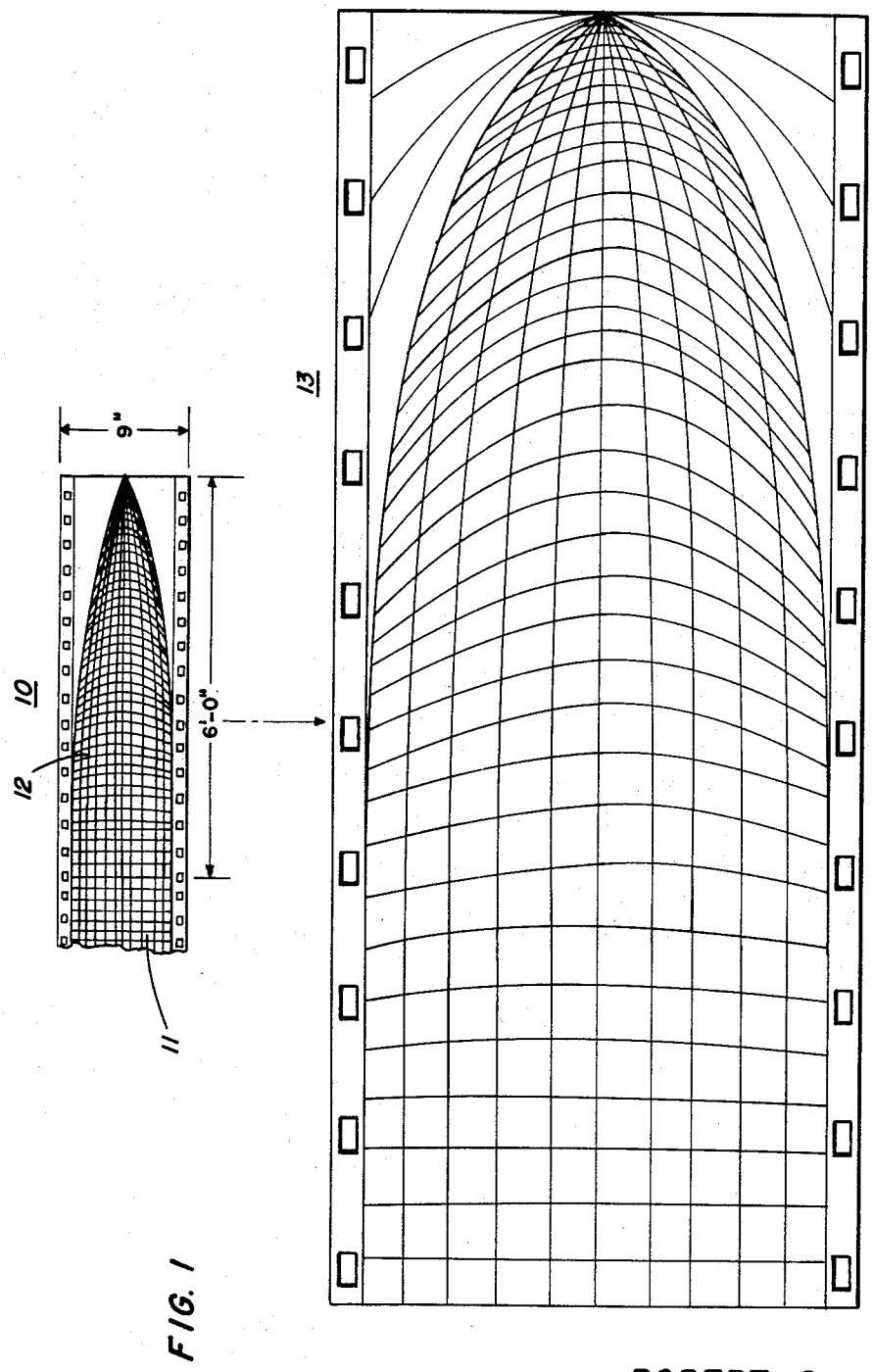
FIG. 1 is a view of a typical negative to illustrate certain prior art problems.

As indicated, certain of the repetitive image presentation concepts of cinematography are utilized in a unique manner in the novel techniques of the present invention as applied to the production of high quality in photo readout products for use in photo interpretation. The requirement for the optimum utilization of the available resolution of high acuity film, as reduced for purpose of observation to within the limits of man's perception, can best be accomplished by an optical transfer (that is, to take an enlarged picture of the original negative) such that by selectively and sequentially varying the magnitude of illumination behind the original negative during a printing process a resulting series of positive transparencies will be obtained which series contains a maximum amount of information in both resolution and contrast (gray scale). This series of positive transparencies can then in turn be projected without the substantial information loss now incurred by the contact printing process. As a rule, the resolution of the optical system required to achieve a high quality transfer must be at least three times the quality of the product being copied. Size is one of the main limiting factors in high acuity optics. The present state of the art is such as to allow the production of high quality optics for narrow fields of view and small areas at wide apertures. This is well demonstrated in microscopes and micrographs. However, it is very difficult to produce large optics to efficiently transfer or enlarge areas as large as a 9 inch square. Further, the products of such an enlargement would be too large to handle in any way as to permit efficient readout for the rapid maintenance of orientation.

The high acuity original negative is a form of photographic storage that is almost unusable, in its chemically developed state, by the human viewer. For example, the negative can vary in format, size density characteristics, area, scale, and resolved ground size, and has many times the capability of the human being for the recording of shape, size, contrast and resolution.

The negative is not selective in that is records all of the detail in the scene including both natural and cultural features including the remnants of all previous features in the same scene. It can cover vast geographic areas at extremely small scale and yet at the maximum of its resolution record extremely high detail at any point. The basic problem for adaptation of such acuity negatives for human observation is to change this record into meaningful intelligence which can be read out by the human being at his rate of assimilation so that the significance of the entire record may be interpreted in a timely, accurate and orderly fashion.

The present invention essentially involves the producing of a moving picture-like sequence of small areas of the high acuity original negative to produce a record within the capability of the photo interpretation to assess its significance.

A wide variety of possible techniques may be used in the production of this moving picture.

Referring now to FIG. 1, the difficulties inherent in a straightforward magnification of a negative produced by aerial photography techniques will be apparent. FIG. 1 shows one-half of a single frame 10 of a negative which might be produced on an aerial photographing mission using an off-axis catadioptic camera. The other half of the frame would continue at end 11 as shown by the broken line. The frame itself is produced by an angular scan beginning directly under the photographing aircraft and extending out toward the horizon. As shown by the curvature of the lines 12 in the image, due to the curvature of the earth, distances near the horizon will be substantially distorted from those near the aircraft itself. The half of each frame of the negative shown may be 9 inches by approximately 6 feet as indicated by the dimensions thereon. as previously stated, the negative is made from a high acuity film capable of resolutions at least as high as 300 lines per millimeter. For this image to be useful to the human observer, it is clear that it must be magnified sufficiently to bring the spacial frequencies to within the capabilities of the human eye, e.g., approximately 4 lines per millimeter. Therefore, it is clear that at least a magnification of 60 to 65 times would be necessary if the human observer were to be able to obtain meaningful information from a direct contact print or transparency. In order to maintain geogrpahical orientation within the single frame, it would be necessary for the observer to view the entire magnified print at one time. This means that optics would have to be devised which would be capable of projecting an image 13 approximately 49 feet by 390 feet for the 6 foot by 9 inch negative, and at the same time be able to correct for the variable distortion produced at the horizon end of the negative. Clearly, this represents a demand far beyond the bounds of practicality and the state of the art. In addition, viewing an image of such vast size as that necessary by a straightforward magnification and projection would not permit an accurate or rapid determination of distance, sizes, etc., by the observer. Therefore, it is quite clear that an entirely different technique of magnification of the 9 inch by 6 foot negative is necessary. It should be recognized, of course, that the techniques of this invention are not limited to use with a negative frame of the type shown in FIG. 1, but rather will find great utility in connection with aerial photographic techniques employing other presently existing type cameras as well as those which may be developed in the future.

Figure 2:
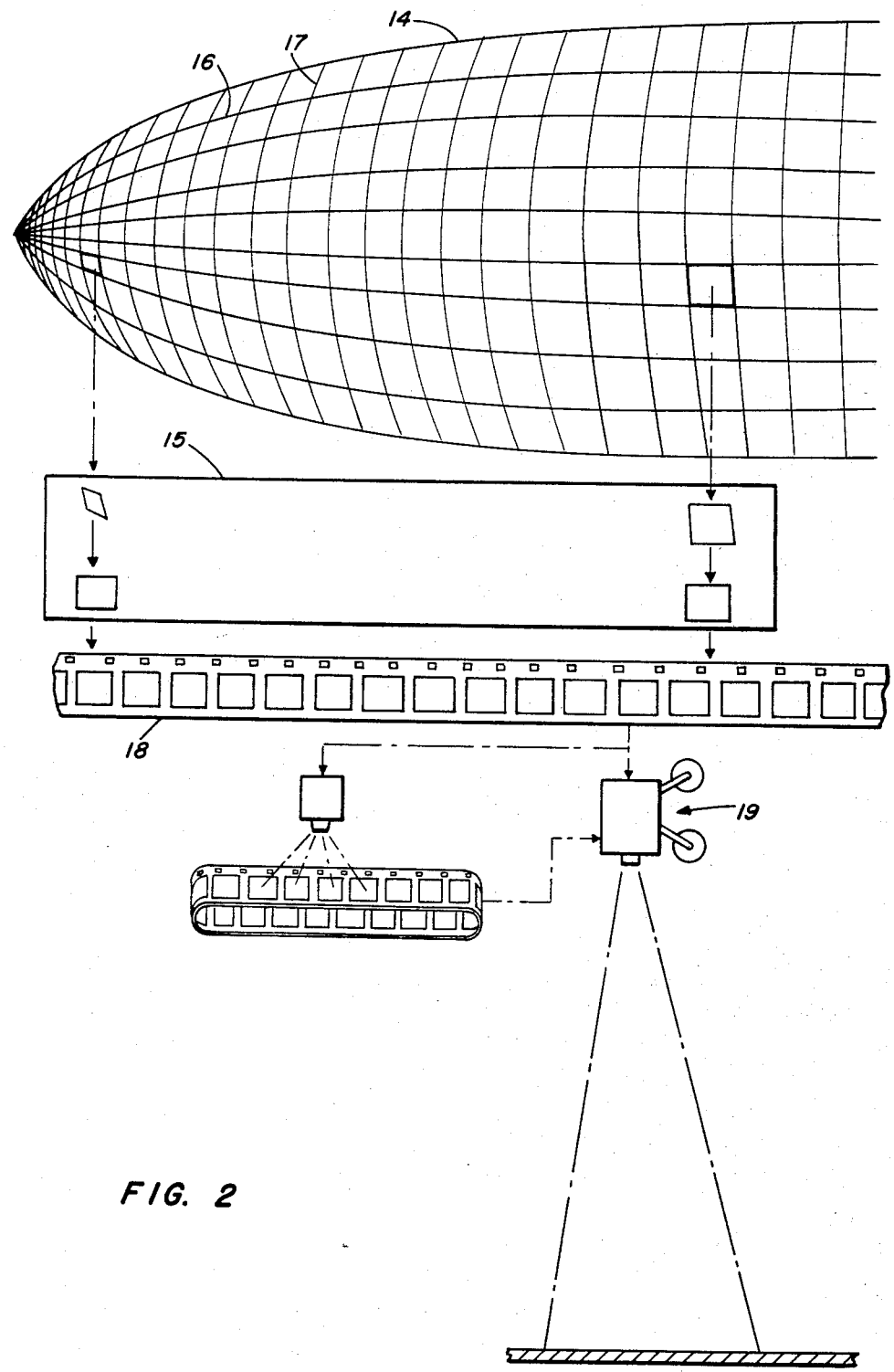
FIG. 2 shows in diagrammatic form the steps comprising the present invention.

In FIG. 2 is shown an illustration of the steps which take place in processing the photographic negative according to the present invention. First, the negative, a section 14 of which is shown in the figure is provided to a copying machine 15 capable of an intermediate degree of magnification, for example, four times, having a wide aperture lens, and means to correct for the distortion produced by the earth's curvature by means of two dimensional inclination of the optical axis of the copier. The portion of the negative 14 is shown having thereon horizontal and vertical lines 16 and 17 to emphasize the effect of curvature induced distortion; however, it should be realized that an actual negative will contain intelligence information which is dimensionally distorted substantially as indicated by the curvature of the lines. The copying machine may be arranged so that it will successively photograph portions of the negative and reproduce these in the form of a motion picture positive transparency, for example, on 35 millimeter film. For magnification of four times and a reproduction onto 35 millimeter film, the successive segments of the negative portion 14 that are to be photographed may advantageously be approximately one quarter of an inch on a side. In addition to the recording of the image on the film, there may advantageously be some suitable code recorded on each frame to identify the particular quarter inch segment of the negative photographed on that frame. The positive transparency film may then be developed and may be provided in the form of a motion picture film 18 to any suitable viewer 19. If the transfer from the initial aerial photograph to the screen, a total magnification of approximately 65 times is desired, it will be necessary in the projection onto the screen 20 to provide an additional magnification in the projector 19 of approximately 16 times over that produced by copier 15.

Upon the discovery by the photo interpreter of some interesting or potentially significant target or piece of intelligence information, the particular 35 millimeter frame of interest may be isolated and the information thereon enhanced by various techniques of movie photography to be hereinafter described. The enhanced frame may then be considered by the photo interpreter whereby more accurate judgment as to the intelligence value of the information in the original negative may be made.

The cinematic technique addresses itself to the solution of two different types of problems inherent in the present techniques of photo interpretation, namely that of automating the process of interpreting the negative while at the same time maintaining orientation with respect to it and to the overall film from which the negative is taken, and secondly, to the enhancement of the information present in the negative or sections thereof to overcome some of the inherent physical limitations of the optics, of the film, and of the human eye.

The first of these aspects is seen to be accomplished by the re-photographing of successive small segments of each negative, onto a motion picture transparency film and by the addition to each frame of the motion picture, of a coded segment representing orientation. The orientation code may, as discussed in applicant's copending application, Ser. No. 444,474, entitled "Dual Cursor Plotter," filed Mar. 31, 1965, Patent No. 3,355,750, provide one input to an overall control computer and will serve to generate a display to provide instantaneous orientation data for the photo interpreter.

The second of the aspects of the cinematographic technique, namely that of image enhancement, solves a number of basic problems. One of these problems is that when radiation from a point source of light impinges upon the negative, it does not produce a sharp spot corresponding to its actual outline, but rather produces an effect quite similar to the effect of passing an electrical impulse through a real filter, namely, the high frequencies are attenuated. In terms of photographic effect, in an ideal situation, the transition from the image of the spot to the surrounding areas of non-illumination on the negative would involve extremely high changes in the spacial frequencies recorded on the negative.

Since the film has a tendency to attenuate these high spacial frequencies, the desired sharp image on the negative is blurred. This high frequency attenuation is attributed to such causes as the spread function of the film itself, the granularity of the film, and even physical characteristics of the lens being used to produce the negative.

The effect of this attenuation, as well as the effect of other random imperfections in the finished negative (or in the present instance, in the transparency produced by the copying mechanism 15) may be overcome by the utilization of the persistence of the human eye in substantially the same manner that a sufficiently high frame rate overcomes the problem of flicker in a motion picture. Mathematically speaking, it is known in the field of information theory that the improvement in the signal to noise ratio of an information bearing signal may be improved in accordance with the square root of the number of times that the signal is integrated before an attempt is made to extract the information. Applying this knowledge to the cinematic technique, upon the discovery in a frame of the enlarged motion picture 18 of potentially significant intelligence data, a large number of copies of this particular frame may be made for viewing by the interpreter. In this case, the succession of photographs may be made into an endless loop 20 and upon projection, the persistence of the eye will cause an integration of the image which can materially reduce the effects on the image of the spread function and film graininess. By taking a sufficiently large number of images of the same frame, any desired degree of signal to noise improvement may be effected.

Another of the problems that is overcome by the enhancement technique of the present invention is that in the process of enlargement of any negative, the spacial rate of change of contrast or the acuteness of the image is decreased. If acuteness is measured as a certain number of units per millimeter, by the enlargement, which is in effect an increase of the millimeter scale by some given factor, there of necessity results a decrease of the rate of change of contrast by that same factor.

Two possible techniques are available to compensate for this. First, the succession of photograph 20 taken of the frame of interest may be made on a film having different contrast characteristics than that of the original. In this way, by a careful selection of the type of film used, various characteristics of the negative may be selectively emphasized. A second technique involves the selective variation of the intensity of the light source used in the copying of the frame of interest. By properly varying the light levels behind the frame being copied, various parts of the gray scale can be emphasized in order to distinguish, for example, between an aircraft on a white runway or an aircraft on a black runway, or even an aircraft in the shade or some other element in the picture whose color is very close in the gray scale to that of the background. This enhancement does not eliminate the background, but rather expands the gray scale at that particular area to distinguish more clearly the gradations between the image of interest and its background. Again, by careful selection of the contrast characteristics of the copying film, the background is not eliminated, but rather there results an increase in the range of grays thereby separating the shade of the particular object of interest from that of the background. Thus, if there are in fact a number of shades of gray between the desired object and its background, a careful selection of the contrast characteristics of the copying film will bring out the existence of these shades emphasizing the presence and detail of the object of interest.

Similar and complementary effects result from the variation of the light level. By making a sufficient number of copies of the original frame of interest, at a particular light level, and then making a number of copies at different light levels, and making an endless loop of the transparencies thus provided, various aspects of the image may successively be enhanced to increase the information content of the photograph in the form useful to the observer.

Figure 3:
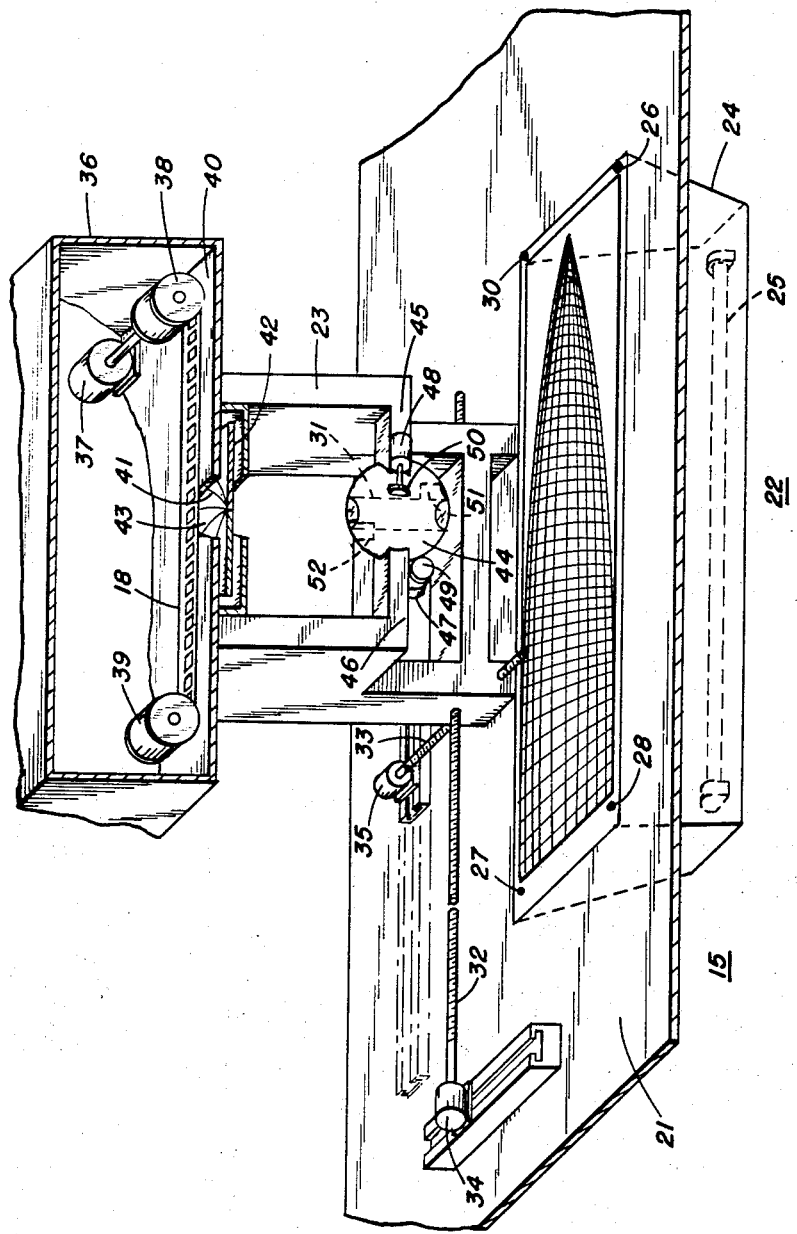
FIG. 3 shows the structure of a copying machine which might be useful in the practice of the method of FIG. 2.

FIG. 3 shows in simplified form the structure and arrangement of a copying device 15 suitable for providing the enlarged transparency of the photo reconnaissance negative. Operation of the copier may be under the control of a suitably programmed computer (not shown) which forms no part of the present invention.

The copier itself comprises a supporting structure 21 upon which is provided a light table 22 and a movable carriage 23 for supporting the optics and the copying film. Light table 22 comprises a housing 24 having therein the light source 25, the intensity of which may be determined by the control computer. Mounted on the top of the housing 24 is a diffusing structure 26 having thereon registration pins 27 through 30 for accurately positioning a single frame of the photo reconnaissance negative 10.

Carriage 23 is arranged to move both transversely and longitudinally of the light table so that the axis of the optical system 31 may be successively positioned over the entire area of the frame 10. Motion of the carriage 23 is provided by screw members 32 and 33 under the control of motors 34 and 35. Motors 34 and 35 may be digitally controlled to very accurately position the carriage 23 at any desired point on the negative. Positioning signals for the motors may be provided by the control computer, or manually, in the manner shown in Patent No. 2,660,920.

Carriage 23 supports at its upper end a light tight compartment 36 housing the transparency film being exposed. Compartment 36 includes therein a motor 37 and suitable supply reels 38 and 39 for the transparency film. Motor 37 may be suitably controlled by the computer to advance the film one frame for each successive exposure. The lower surface 40 of light tight compartment 36 is provided with an aperture 41 closed by a shutter 42 the opening of which is controlled by the computer. In addition, if desired, a suitable diaphragm 43 may be provided to control the size of the opening in response to commands from the computer.

Also mounted on movable carriage 23 is an optical structure 31. For reasons to be described hereafter, it is necessary to vary the orientation of the axis of the optical system with respect to the plane of the light table. To this end, the optical structure is mounted in a spherical frame 44, supported by extensions 45 and 46 of the movable carriage 23. As shown, the end of extensions 41 and 46 are concave in shape and are provided with the same radius of curvature as the spherical structure 44. In this way extensions 45 and 46 provide a bearing surface and support for the optical housing.

Variation in the orientation of the optical axis is provided by means of motors 47 and 48 having thereon rubber wheels 49 and 50 in contact with the spherical surface.

Positioning signals for motors 47 and 48 may be provided by the control computer to variably position the sphere. As shown, each wheel is positioned on a great circle of the sphere, 90° from the other, and so oriented that motor 47 will effect a change in the optical axis along a line exactly transverse of the photo reconnaissance negative frame 10 while motor 48 will effect a variation of the optical axis along a line running longitudinally of the mounted negative.

Variation of the axis of the optical system 31 is necessary in order that local rectification may be provided to compensate for the angularly dependent distortion of distances in the negative as indicated by the curved lines thereon. Such rectification is effected by selectively tilting the optical axis with respect to the plane of the negative thereby introducing a compensating distortion in the distances recorded on film 18. For a given photo reconnaissance camera, it is known in advance the relationship between position on the frame and the distortion therein. This information may be suitably provided to the control computer whereby for a given longitudinal and transverse position of the optical system, a predetermined angular correction may be made automatically. Spherical member 44 may also include a suitable density measurement device 51 which may sense variations in the overall light level at various places on the negative. Therefore, if it is desired, while a particular portion of negative 10 is being photographed, density measuring device 51 may sense the density of the next portion of the negative to be photographed, provide a signal indicative of this density to the control computer whereby after positioning of the optical system over the next portion of the negative to be photographed, a suitable signal may be provided to the illumination source 25 by the computer to vary its intensity to provide more nearly uniform optical density over the entire negative.

Attached to optical system 31 may be an encoding device 52 under the control of the computer to generate a coded signal for recording on transparency film 18 indicative of the location of the segment of the negative 10 contained in that frame with respect to the negative. Encoding device 52 may advantageously be positioned so as to record in the sound track portion of the film the desired coded information.

Lens elements 31 may be of any suitable type and would be arranged to provide the desired magnification needed for the immediate magnification of the transparency. The entire copying device may be enclosed in a suitable light tight cover (not shown) to more accurately control the illumination of the motion picture transparency. Of course, it should be recognized that various other possible embodiments of a copying device may replace that shown in FIG. 3.

While the present techniques have been described in regard to a monoscopic display, one of the most valuable tools of the photo interpreter is the use of a three dimensional model produced through a stereoscopic display. The techniques of the present invention are readily adaptable to the production of such a display. Because of the persistence of the retina of the human eye, the reception of separate images at a rate of greater than approximately 25 frames per second cannot be detected. Therefore, it is possible to fuse pictures with slight changes at this rate to give the viewer a feeling of motion. Since stereo perception depends on the left eye receiving a slightly different perspective from that being received by the right eye, an area of the negative copied according to the present invention may be exposed on every other frame, and then the stereo-conjugate image exposed on the intervening frames. Projection of this sequence of frames from a single projector at twice the normal flicker rate (i.e., approximately 50 frames per second) through a device which successively blocks the view to one of the eyes in synchronism with the display of the image or its stereo conjugate, will result in the automataed production of a high quality stereo image for the photo interpreter. Further discussion of this technique may be found in applicant's copending application, Ser. No. 497,561, entitled "Improved Stereo Viewing System," filed Oct. 18, 1965. Such techniques, as well as the monoscopic techniques described previously, are readily adaptable for use with the Photo Interpretation Cell, Ser. No. 497,563, filed Oct. 18, 1965.

It should be understood, of course, that the foregoing disclosure relates to only a preferred embodiment of the invention and that numerous modifications or alterations may be made therein without departing from the spirit and scope of the invention as set forth in the appended claims.

I claim:
1. The method of interpreting information contained in a photographic record which comprises
dividing the photographic record into a number of segments,
exposing in succession a number of frames of photographic film, each frame representative of one segment of the photographic record,
providing a motion picture positive transparency from the exposed photographic film, selecting one frame from the motion picture transparency, exposing in succession a number of frames of a second photographic film differing in contrast characteristics from the first photographic film, each frame of the second photographic film being representative of the selected frame of the transparency, producing from the second photographic film a continuous film strip, and viewing the continuous film strip by means of a motion picture projector.

2. The method of claim 1 wherein the illumination of the frame of the transparency is varied in a predetermined manner as each frame of the second photographic film is being exposed.

References Cited

UNITED STATES PATENTS

| | | | |
|---|---|---|---|
| 1,341,108 | 5/1920 | Burnett | 352—126 |
| 1,556,566 | 10/1925 | Wright | 352—58 |
| 1,898,905 | 2/1933 | Seitz | 352—47 |
| 3,199,404 | 8/1965 | Bragg et al. | 88—24 |
| 3,183,770 | 5/1965 | Nyman et al. | 88—24 |

JULIA E. COINER, *Primary Examiner.*